United States Patent [19]

Neeff et al.

[11] 4,323,671
[45] Apr. 6, 1982

[54] ANTHRAQUINONE DERIVATIVES, PROCESSES FOR THEIR PREPARATION, PROCESSES FOR PIGMENTING ORGANIC MACROMOLECULAR SUBSTANCES, AND PIGMENTED ORGANIC MACROMOLECULAR MATERIAL

[75] Inventors: Rütger Neeff; Meinhard Rolf; Walter Müller, all of Leverkusen, Fed. Rep. of Germany

[73] Assignee: Bayer Aktiengesellschaft, Leverkusen, Fed. Rep. of Germany

[21] Appl. No.: 140,348

[22] Filed: Apr. 14, 1980

[30] Foreign Application Priority Data

Apr. 28, 1979 [DE] Fed. Rep. of Germany ....... 2917312

[51] Int. Cl.$^3$ ............................................. C07D 215/22
[52] U.S. Cl. ........................................ 542/415; 8/506; 8/508; 8/509; 8/510; 8/512; 8/513; 8/514; 8/515; 8/516; 8/518; 8/519; 8/637; 8/677
[58] Field of Search ............................ 542/415; 8/677; 546/155

[56] References Cited

U.S. PATENT DOCUMENTS

| 4,078,086 | 3/1978 | Winkelmann et al. | 542/415 X |
| 4,122,117 | 10/1978 | Ando et al. | 542/420 X |
| 4,131,676 | 12/1978 | Lang et al. | 542/415 X |
| 4,246,401 | 1/1981 | Neeff et al. | 542/420 X |

FOREIGN PATENT DOCUMENTS 2728863 6/1977 Fed. Rep. of Germany .
2728864 6/1977 Fed. Rep. of Germany .
51-140926 5/1975 Japan .

OTHER PUBLICATIONS

Patent Abstracts of Japan, unexamined applications, Section C, band 1, No. Mar. 27, 28, 1977, containing abstract of Kokai patent 51-140 926.

*Primary Examiner*—Arthur P. Demers
*Attorney, Agent, or Firm*—Sprung, Felfe, Horn, Lynch & Kramer

[57] ABSTRACT

Anthraquinone derivatives which, in one of their tautomeric structures, correspond to the formula

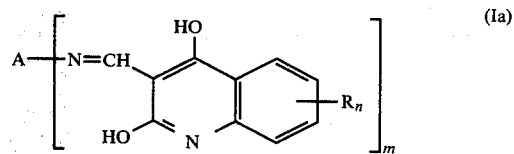

in which
A denotes an anthraquinone radical which is free from sulphonic acid groups, is optionally further substituted and preferably consists of at most 5 fused rings,
m denotes a number from 1 to 4, preferably 1 or 2,
R denotes a substituent and
n denotes 0, 1, 2, 3 or 4, processes for their preparation, their use for pigmenting organic macromolecular substances, and the material pigmented in this manner.

2 Claims, No Drawings

ANTHRAQUINONE DERIVATIVES, PROCESSES FOR THEIR PREPARATION, PROCESSES FOR PIGMENTING ORGANIC MACROMOLECULAR SUBSTANCES, AND PIGMENTED ORGANIC MACROMOLECULAR MATERIAL

The invention relates to anthraquinone derivatives which, in one of their tautomeric structures, correspond to the formula

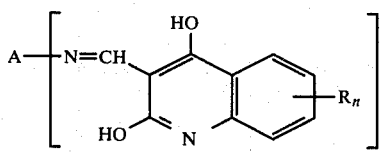

processes for their preparation and their use as pigments.

Further tautomeric forms of the compounds according to the invention correspond to the formulae

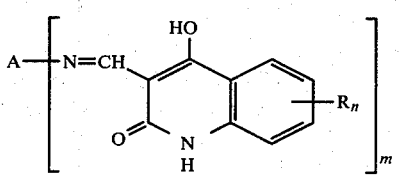

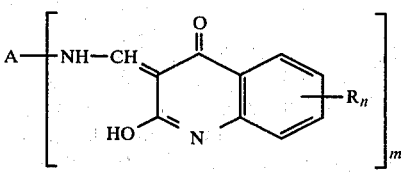

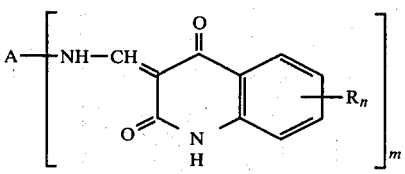

In the formulae (Ia), (Ib), (Ic) and (Id),

A denotes an anthraquinone radical which is free from sulphonic acid groups, is optionally further substituted and preferably consists of at most 5 fused rings, m denotes a number from 1 to 4, preferably 1 or 2, R denotes a substituent and n denotes 0, 1, 2, 3 or 4.

Suitable substituents R are, for example, halogen, such as chlorine and bromine, $C_1$–$C_4$-alkyl, $C_1$–$C_4$-alkoxy, nitro, trifluoromethyl, cyano, optionally substituted carbamoyl or sulphamoyl, acylamino or arylamino.

Possible substituents for the carbamoyl and sulphamoyl groups are $C_1$–$C_4$-alkyl, and phenyl and benzyl which are optionally substituted by $C_1$–$C_4$-alkyl, $C_1$–$C_4$-alkoxy, fluorine, chlorine, bromine or nitro. Acyl groups which may be mentioned are, in particular, $C_1$–$C_4$-alkylcarbonyl, and benzoyl which is optionally substituted in the benzene nucleus by chlorine, $C_1$–$C_4$-alkyl, $C_1$–$C_4$-alkoxy or nitro. Arylamino is, in particular, phenylamino which is optionally substituted by $C_1$–$C_4$-alkyl, $C_1$–$C_4$-alkoxy, fluorine, chlorine, bromine or nitro.

As will be shown below, aminoanthraquinones of the formula $$A\text{–}(NH_2)_m \quad \text{(II)}$$

in which

A and m have the abovementioned meaning, are used for the preparation of the new anthraquinone derivatives.

Suitable aminoanthraquinones of the formula (II) are, for example: 1-amino-anthraquinone, 2-aminoanthraquinone, 1-amino-2-chloroanthraquinone, 1-amino-4-chloroanthraquinone, 1-amino-5-chloroanthraquinone, 1-amino-6-chloroanthraquinone, 1-amino-6-(7)-chloroanthraquinone (mixture), 1-amino-5,8-dichloroanthraquinone, 1-amino-2-bromoanthraquinone, 1-amino-2,4-dibromoanthraquinone, 1-amino-6,7-dichloroanthraquinone, 1-amino-6-fluoroanthraquinone, 1-amino-7-fluoroanthraquinone, 1-amino-6,7-difluoroanthraquinone, 2-amino-1-chloroanthraquinone, 2-amino-3-chloroanthraquinone, 2-amino-3-bromoanthraquinone, 1-amino-4-nitroanthraquinone, 1-amino-5-nitroanthraquinone, 1-amino-2-methylanthraquinone, 1-amino-2-methyl-4-chloroanthraquinone, 1-amino-2-methyl-4-bromoanthraquinone, 1-aminoanthraquinone-2-carboxylic acid, 1-aminoanthraquinone-2-carboxylic acid amide, 1-aminoanthraquinone-2-carboxylic acid methyl ester, 1-amino-4-nitroanthraquinone-2-carboxylic acid, 1-amino-2-acetylanthraquinone, 1-amino-5-benzoylaminoanthraquinone, 1-amino-4-benzoylaminoanthraquinone, 1-amino-4-hydroxyanthraquinone, 1-amino-5-hydroxyanthraquinone, 1-amino-4-methoxyanthraquinone, 1-amino-2-methoxy-4-hydroxyanthraquinone, 1-amino-4-methylaminoanthraquinone, 1-amino-4-cyclohexylaminoanthraquinone, 1-amino-4-anilinoanthraquinone, 1-amino-6-methylmercaptoanthraquinone, 2-phenyl-6-amino-4,5-phthaloylbenzimidazole, 6-chloro-2-amino-3,4-phthaloylacridone, 7-chloro-2-amino-3,4-phthaloylacridone, 5-chloro-8-amino-3,4-phthaloylacridone, 3-methyl-6-amino-anthrapyridone, 3-methyl-7-amino-anthrapyridone, 4-amino-1,9-pyrazolanthrone, 5-amino-1,9-pyrazolanthrone, 4-amino-1,9-anthrapyrimidine, 5-amino-1,9-anthrapyrimidine, 1,5-diaminoanthraquinone, 1,4-diaminoanthraquinone, 1,8-diaminoanthraquinone, 2,6-diaminoanthraquinone, 1,5-diamino-4-chloroanthraquinone, 1,4-diamino-5-nitroanthraquinone, 1,5-diamino-2,4,6,8-tetrabromoanthraquinone, 1,5-diamino-4,8-dihydroxyanthraquinone, 1,8-diamino-4,5-dihydroxyanthraquinone, 4,4'-diamino-1,1'-dianthrimide, 1-amino-8-benzoylaminoanthraquinone and 1-amino-2-bromo-4-(4-methylphenylsulphonylamino)-anthraquinone.

Preferred anthraquinone derivatives correspond to the formula

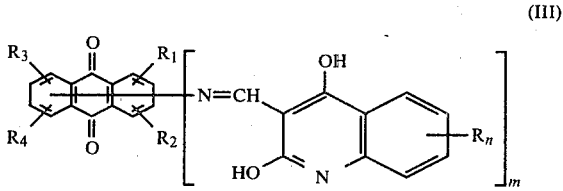

or the corresponding tautomeric formula, wherein

R, n and m have the abovementioned meaning, $R_1$ denotes hydrogen, halogen, such as fluorine, chlorine and bromine, nitro, $C_1$-$C_4$-alkyl, $C_1$-$C_4$-alkoxy, $C_1$-$C_4$-alkylamino, benzylamino, cyclohexylamino, $C_1$-$C_4$-alkylmercapto, phenylmercapto which is optionally substituted by $C_1$-$C_4$-alkyl, $C_1$-$C_4$-alkoxy, fluorine, chlorine, bromine or nitro, $C_1$-$C_4$-alkylcarbonyl, $C_1$-$C_4$-alkoxycarbonyl, phenylamino which is optionally substituted by $C_1$-$C_4$-alkyl, $C_1$-$C_4$-alkoxy, chlorine or nitro, carbamoyl which is optionally monosubstituted or disubstituted by $C_1$-$C_4$-alkyl, benzyl or phenyl, it being possible for phenyl to be substituted by $C_1$-$C_4$-alkyl, $C_1$-$C_4$-alkoxy, fluorine, chlorine, bromine or nitro, carboxyl, hydroxyl, $C_1$-$C_4$-alkylcarbonylamino, benzoylamino which is optionally substituted by $C_1$-$C_4$-alkyl, $C_1$-$C_4$-alkoxy, chlorine, bromine or nitro, or phenylsulphonylamino which is optionally substituted by $C_1$-$C_4$-alkyl, $C_1$-$C_4$-alkoxy, fluorine, chlorine, bromine or nitro, $R_2$ denotes hydrogen, chlorine or hydroxyl, $R_3$ denotes hydrogen, halogen, such as fluorine, chlorine or bromine, nitro, $C_1$-$C_4$-alkyl, $C_1$-$C_4$-alkoxy, $C_1$-$C_4$-alkylamino, $C_1$-$C_4$-alkylmercapto, phenylmercapto which is optionally substituted by $C_1$-$C_4$-alkyl, $C_1$-$C_4$-alkoxy, fluorine, chlorine, bromine or nitro, $C_1$-$C_4$-alkoxycarbonyl, $C_1$-$C_4$-alkylcarbonyl, benzylamino, cyclohexylamino, phenylamino which is optionally substituted by $C_1$-$C_4$-alkyl, $C_1$-$C_4$-alkoxy, chlorine, bromine or nitro, carboxyl, hydroxyl, carbamoyl which is optionally monosubstituted or disubstituted by $C_1$-$C_4$-alkyl, benzyl or phenyl, it being possible for phenyl to be substituted by $C_1$-$C_4$-alkyl, $C_1$-$C_4$-alkoxy, fluorine, chlorine, bromine or nitro, $C_1$-$C_4$-alkylcarbonylamino, benzoylamino which is optionally substituted by $C_1$-$C_4$-alkyl, $C_1$-$C_4$-alkoxy, chlorine, bromine or nitro, $C_1$-$C_4$-alkylsulphonylamino, or phenylsulphonylamino which is optionally substituted by $C_1$-$C_4$-alkyl, $C_1$-$C_4$-alkoxy, fluorine, chlorine, bromine or nitro and $R_4$ denotes hydrogen, halogen, such as fluorine, chlorine and bromine, or hydroxyl.

Anthraquinone derivatives which, in one of their tautomeric structures, correspond to the formula

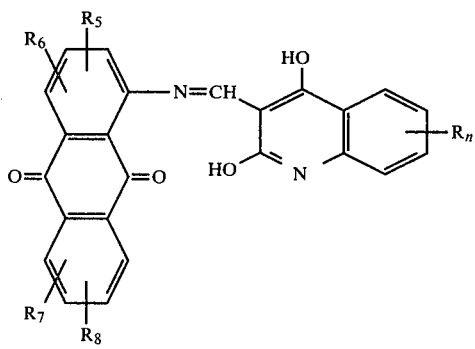

(IV)

wherein

R and n have the abovementioned meaning and $R_5$, $R_6$, $R_7$ and $R_8$ denote hydrogen, chlorine, bromine, carboxyl, $C_1$-$C_4$-alkoxycarbonyl, carbamoyl, $C_1$-$C_4$-alkylcarbonylamino, benzoylamino which is optionally substituted by 1 or 2 nitro groups or 1 to 5 chlorine or bromine atoms, $C_1$-$C_4$-alkylsulphonylamino, phenylsulphonylamino which is optionally substituted by methyl, methoxy or chlorine, or a radical of the formula

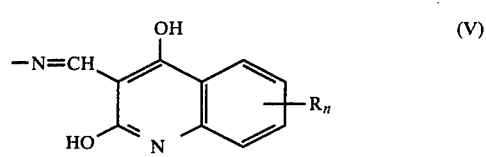

are particularly preferred.

The anthraquinone derivatives (Ia-d) can be prepared from the aminoanthraquinones of the formula

and the 2,4-dihydroxy-quinolines, optionally substituted in the 5-, 6-, 7- and/or 8-position, of the formula

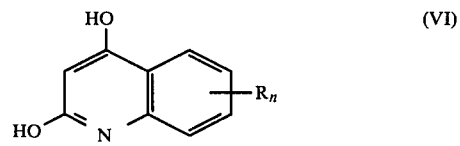

in which R and n have the abovementioned meaning, by several processes.

(1) The 2,4-dihydroxy-quinolines, optionally substituted in the 5-, 6-, 7- and/or 8-position, of the formula (VI) are subjected to a condensation reaction with a trialkyl orthoformate of the formula

in which R' preferably represents a $C_1$-$C_4$-alkyl group, at 100°–220° C. in an organic solvent which is inert towards the reactants, and the resulting 2-hydroxy-3-alkoxymethylene-4-oxo-3,4-dihydro-quinolines, optionally substituted in the 5-, 6-, 7- and/or 8-position, of the formula (VIII)

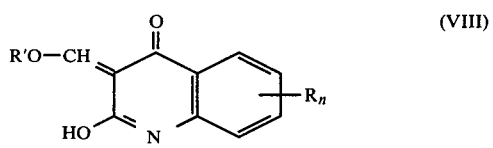

in which R, R' and n have the abovementioned meaning, are then reacted with an aminoanthraquinone of the formula

at 100°–220° C., preferably 120°–180° C., in the same reaction medium or another organic reaction medium.

(2) The aminoanthraquinones of the formula

are subjected to a condensation reaction with a trialkyl orthoformate of the abovementioned formula (VII) at 100°–220° C., preferably 120°–180° C., in an organic solvent which is inert towards the reactants, and the resulting formimino-esters of the formula

in which R' preferably represents a $C_1$-$C_4$-alkyl group, are then reacted with 2,4-dihydroxy-quinolines, optionally substituted in the 5-, 6-, 7- and/or 8-position, of the abovementioned formula (VI) at 100°–220° C., preferably 120°–180° C., in the same reaction medium or another organic reaction medium.

Suitable organic solvents for processes (1) and (2) are aromatic and hetero-aromatic compounds, such as toluene, chlorobenzene, pyridine, o-dichlorobenzene, 1,2,4-trichlorobenzene or nitrobenzene, alcohols, such as butanol or diethylene glycol monomethyl ether, ethers, such as ethylene glycol dimethyl ether or ethylene glycol diethyl ether, or dipolar aprotic solvents, such as dimethylformamide, dimethylacetamide, N-methylpyrrolidone, tetramethylurea, dimethylsulphoxide or tetramethylenesulphone.

(3) In a further process, the aminoanthraquinones of the formula

are converted, with a dialkylformamide and a thionyl halide, in particular thionyl chloride, into the corresponding formamidinium halides of the formula

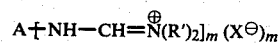

wherein
R' preferably represents a $C_1$–$C_4$-alkyl group and
X represents chlorine or bromine, at 40°–100° C., preferably 40°–80° C., in an organic solvent which is inert towards the reactants, and the resulting formamidinium halides (X) are subjected to condensation reactions with 2,4-dihydroxy-quinolines, optionally substituted in the 5-, 6-, 7- and/or 8-position, of the abovementioned formula (VI) at 100°–220° C., preferably 120°–180° C., in the same solvent or another organic solvent, in the presence of an acid-binding agent.

Suitable organic solvents for process (3) are, in particular, aromatic hydrocarbons, such as toluene, chlorobenzene, o-dichlorobenzene, 1,2,4-trichlorobenzene or nitrobenzene, ethers, such as ethylene glycol dimethyl ether or ethylene glycol diethyl ether, or dipolar aprotic solvents, such as dimethylformamide, diethylformamide, N-methylpyrrolidone, dimethylsulphoxide or tetramethylenesulphone.

The dialkylformamides used are preferably lower dialkylformamides, such as dimethylformamide or diethylformamide, but cyclic alkyl-carboxylic acid amides, such as N-methylpyrrolidone, can also be employed.

Acid-binding agents which are used in process (3) are alkali metal hydroxides or carbonates or alkaline earth metal hydroxides or carbonates, or alkali metal salts or alkaline earth metal salts of aliphatic carboxylic acids, preferably sodium carbonate, bicarbonate or acetate or potassium carbonate, bicarbonate or acetate.

The compounds of the formulae (Ia-d) are obtained in a form suitable for use as pigments, or they can be converted into the suitable form by after-treatment processes which are known per se, for example by dissolving or swelling in strong inorganic acids, such as sulphuric acid, and discharging the mixture onto ice. Fine division can also be achieved by grinding with or without grinding auxiliaries, such as inorganic salts or sand, if appropriate in the presence of solvents, such as toluene, xylene, dichlorobenzene or N-methylpyrrolidone. The tinctorial strength and transparency of the pigment can be influenced by varying the after-treatment.

Because of their fastness to light and migration, the compounds of the formulae (Ia-d) are suitable for the most diverse pigment applications. The pigments can be used for the production of very fast pigmented systems, such as mixtures with other substances, formulations, paints, printing inks, dyed paper and dyed macromolecular substances. Mixtures with other substances can be understood, for example, as mixtures with inorganic white pigments, such as titanium dioxide (rutile) or with cement. Formulations are, for example, flush pastes with organic liquids, or pastes and fine pastes with water, dispersing agents and, if appropriate, preservatives. The term paint means, for example, lacquers which dry physically or by oxidation, stoving lacquers, reactive lacquers, two-component lacquers, emulsion paints for water-resistant coatings, and distempers. Printing inks are to be understood as those for paper printing, textile printing and tinplate printing. The macromolecular substances can be of natural origin, such as rubber, or obtained by chemical modification, such as acetyl cellulose, cellulose butyrate or viscose, or synthetically produced, such as polymers, polyaddition products and polycondensates. Macromolecular substances which may be mentioned are plastic compositions such as polyvinyl chloride, polyvinyl acetate, polyvinyl propionate, polyolefins, for example polyethylene, or polyamides, high molecular weight polyamides, polymers and copolymers of acrylates, methacrylates, acrylonitrile, acrylamide, butadiene and styrene, and polyurethanes and polycarbonates. The substances pigmented with the claimed products can be in any desired form.

The pigments of the formulae (Ia-d) furthermore have excellent fastness to water, fastness to oil, fastness to acid, fastness to lime, fastness to alkali, fastness to solvents, fastness to over-lacquering, fastness to over-spraying, fastness to sublimation, stability to heat and stability to vulcanisation, are of very high tinctorial strength and can easily be dispersed in plastic compositions.

EXAMPLE 1

(a) 11 g of 97% pure 1-amino-anthraquinone, 8.5 g of triethyl orthoformate and 120 g of nitrobenzene are stirred at 140°–145° C. for about 3 hours, the ethanol formed being distilled off over a bridge and the formation of the formimino-ester of the formula

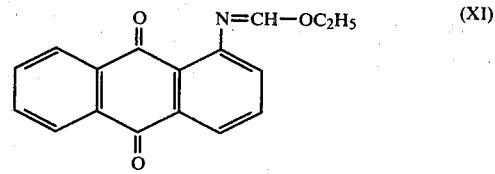

being followed by thin layer chromatography. After the 1-amino-anthraquinone has disappeared, 8 g of 2,4-dihydroxy-quinoline are added to the reaction mixture and the mixture is heated for a further 2–3 hours to 145°–150° C. It is then allowed to cool to 100° C. and the pigment which has crystallised out in yellow prisms is filtered off, washed with hot nitrobenzene and methanol and dried at 100° C.

17.7 g (91% of theory) of the reddish-tinged yellow pigment of the formula

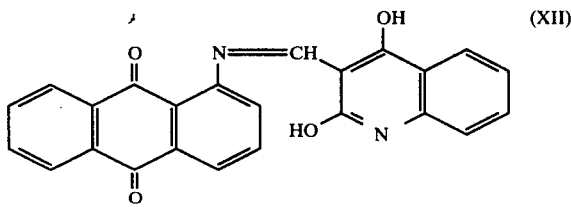

are thus obtained.

$C_{24}H_{14}N_2O_4$ (394) Calculated: C 73.1; H 3.55; N 7.11; O 16.24. Found: C 73.3; H 3.6; N 7.2; O 16.5.

The pigment can also exist in the following tautomeric structures:

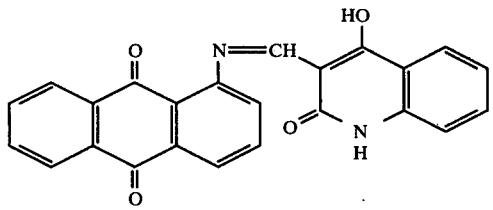

(XIIa)

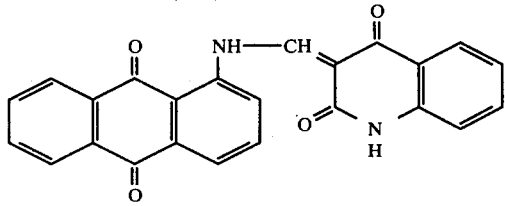

(XIIb)

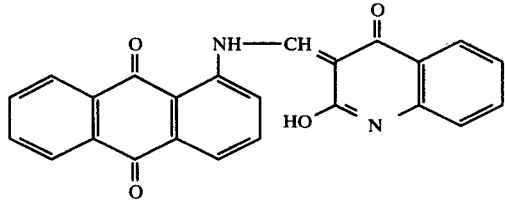

(XIIc)

(b) 7.3 g of thionyl chloride are added to 11 g of 97% pure 1-amino-anthraquinone, 4 g of dimethylformamide and 90 g of nitrobenzene at 50°–60° C. in the course of 1 hour and the mixture is stirred for about 1 hour until the formamidinium chloride of the formula

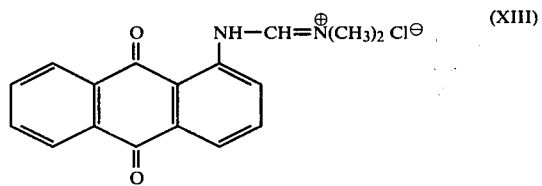

has formed. The reaction mixture is subsequently stirred in vacuo for a further hour to remove the excess thionyl chloride, and 8 g of 2,4-dihydroxy-quinoline and 12.5 g of anhydrous sodium acetate are then added successively and the mixture is heated to 150°–160° C. in the course of about 1 hour. The mixture is stirred at 150°–160° C. until formation of the pigment, which has crystallised in yellow prisms, has ended and the pigment is then filtered off at 100° C., washed with hot nitrobenzene and with methanol and water and dried. 17.5 g (90% of theory) of the reddish-tinged yellow pigment which is identical to that from Example 1a are obtained.

Yellow-coloured anthraquinone pigments corresponding to the formula (XII) are obtained by the processes described in Example 1a or 1b using the 2,4-dihydroxyquinolines, appropriately substituted in the 5-, 6-, 7-and/or 8-position, of the formula (VIa)

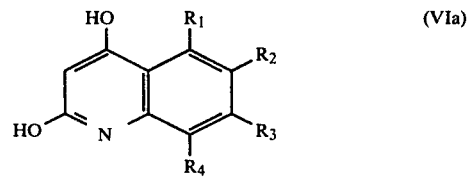

listed in the following table, and 1-amino-anthraquinone:

TABLE 1

| Example | $R_1$ | $R_2$ | $R_3$ | $R_4$ |
|---------|-------|-------|-------|-------|
| 2 | H | H | H | Cl |
| 3 | H | H | Br | H |
| 4 | Cl | Cl | Cl | Cl |
| 5 | $CH_3$ | H | H | H |
| 6 | H | $OCH_3$ | H | H |
| 7 | H | $NO_2$ | H | H |
| 8 | H | H | $NO_2$ | H |
| 9 | H | NH—CO—$CH_3$ | H | H |
| 10 | H | H | NH—CO—$C_6H_5$ | H |
| 11 | H | CO—$NH_2$ | H | H |
| 12 | H | CN | H | H |
| 13 | H | H | $SO_2$—NH—$CH_3$ | H |
| 14 | $CF_3$ | H | H | H |
| 15 | Br | Br | Br | Br |
| 16 | F | H | H | H |

Pigments with excellent properties and similar colour shades are obtained if the following 1-aminoanthraquinone derivatives are used in Examples 1–16 instead of the 1-amino-anthraquinone used in these examples: 1-amino-4-chloro-anthraquinone, 1-amino-5-chloro-anthraquinone, 1-amino-6(7)-chloro-anthraquinone, 1-amino-6,7-dichloro-anthraquinone, 1-amino-2,4-dibromo-anthraquinone, 1-amino-6-fluoro-anthraquinone, 1-amino-4-nitro-anthraquinone, 1-amino-5-nitro-anthraquinone, 1-amino-anthraquinone-2-carboxylic acid amide and 1-amino-2-acetyl-anthraquinone.

EXAMPLE 17

9.8 g of 87% pure 1-amino-5-benzoylamino-anthraquinone and 4.4 g of triethyl orthoformate in 75 g of nitrobenzene are heated to 140°–150° C. for about 2–3 hours, the ethanol formed being distilled off over a short bridge. After the starting material has disappeared, 4.5 g of 2,4-dihydroxy-quinoline are introduced and the mixture is heated for a further 4 hours to 145°–150° C. After cooling to 100° C., the pigment, which has crystallised in yellowish-tinged red needles, is filtered off, washed with hot nitrobenzene and methanol and dried at 100° C. 13.37 g (91% of theory) of the yellowish-tinged red pigment of the formula

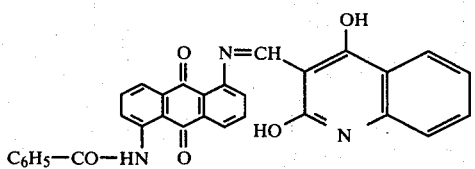

are obtained.

$C_{31}H_{19}N_3O_5$ (513) Calculated: C 72.51; H 3.7; N 8.19. Found: C 72.3; H 3.6; N 8.3.

Trimethyl orthoformate can be used with equal success in the example instead of triethyl orthoformate.

The pigment is obtained in similar yields if the following solvents are used instead of nitrobenzene: o-dichlorobenzene, 1,2,4-trichlorobenzene, diethylene glycol monoethyl ether, diethylene glycol dimethyl ether, dimethylformamide, N-methylpyrrolidone, dimethylsulphoxide and tetramethylene-sulphone.

EXAMPLE 18

8.5 g of 95% pure 1-amino-4-benzoylaminoanthraquinone and 4.4 g of triethyl orthoformate in 100 g of o-dichlorobenzene are heated to 140°–150° C. for about 2–3 hours, the ethanol formed being distilled off over a short bridge. After the starting material has disappeared, 4.5 g of 2,4-dihydroxy-quinoline are introduced and the mixture is heated for a further 4 hours to 140°–150° C. After cooling to 100° C., the pigment, which has crystallised in attractive blue-red needles, is filtered off, washed with hot o-dichlorobenzene and methanol and dried at 100° C. 13.7 g (93.2% of theory) of the dark red pigment of the formula

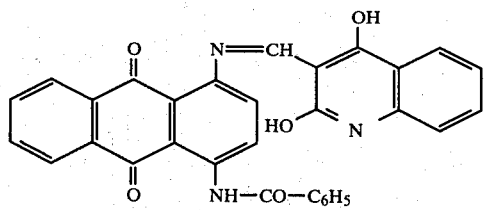

are obtained.

$C_{31}H_{19}N_3O_5$ (513) Calculated: C 72.51; H 3.7; N 8.19. Found: C 72.2; H 3.5; N 8.3.

Pigments with excellent properties and similar colour shades are obtained if 1-amino-4-(4-chlorobenzoylamino)-anthraquinone, 1-amino-4-(2,4-dichlorobenzoylamino)-anthraquinone, 1-amino-4-(3-nitrobenzoylamino)anthraquinone or 1-amino-4-(4-acetylaminobenzoylamino)anthraquinone is used instead of the abovementioned 1-amino-4-benzoylaminoanthraquinone.

EXAMPLE 19

11.8 g of 1-amino-4-hydroxy-anthraquinone, 8.5 g of triethyl orthoformate and 120 g of nitrobenzene are stirred at 140°–145° C. for about 3 hours, the ethanol formed being distilled off over a bridge. After the starting material has disappeared, 8 g of 2,4-dihydroxyquinoline are introduced and the mixture is heated for a further 4 hours to 140°–150° C. After cooling to 100° C., the pigment, which has crystallised in fine red needles, is filtered off, washed with hot nitrobenzene and methanol and dried at 100° C. 18 g (89% of theory) of the bluish-tinged dark red pigment of the formula

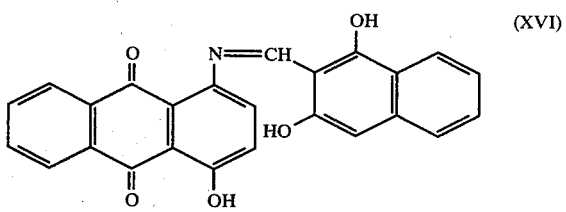

are obtained.

$C_{24}H_{14}N_2O_5$ Calculated: C 70.24; H 3.41; N 6.83. Found: C 69.9; H 3.45; N 6.95.

EXAMPLE 20

5.5 g of 1,5-diamino-anthraquinone and 8.8 g of triethyl orthoformate in 80 g of nitrobenzene are heated to 145°–150° C. for about 3 hours, the ethanol formed being distilled off over a bridge and the disappearance of the starting material being followed by thin layer chromatography. 7.8 g of 2,4-dihydroxy-quinoline are now added and the mixture is heated to 140°–150° C. until the pigment formation has ended, which takes about 4 hours. The pigment, which has crystallised in fine yellow needles, is then filtered off at 120° C., washed with hot nitrobenzene and methanol and dried at 100° C. 13.2 g (98.5% of theory) of the orange-coloured pigment of the formula

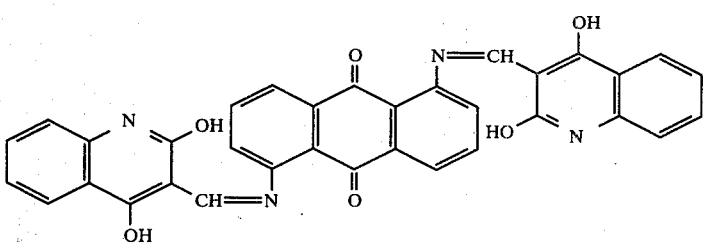

are obtained.

Calculated: N 9.66. Found: N 9.8.

If 5.5 g of 1,8-diamino-anthraquinone are used in Example 20 instead of the abovementioned 1,5-diamino-anthraquinone, 13.04 g (97.3% of theory) of the yellowish-tinged red pigment of the formula

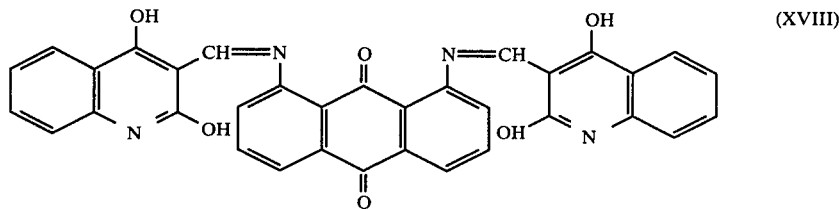

(XVIII)

are obtained.
Calculated: N 9.66. Found: N 9.6.

If 5.5 g of 1,4-diamino-anthraquinone are used in Example 20 instead of the abovementioned 1,5-diamino-anthraquinone, 12.6 g (94% of theory) of the black-brown pigment of the formula

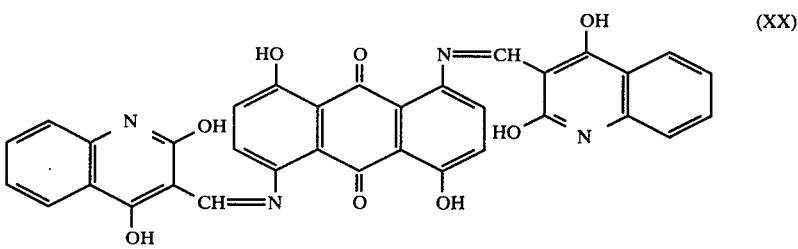

(XIX)

are obtained.
Calculated: N 9.66. Found: N 9.9.

EXAMPLE 21

6.25 g of 1,5-diamino-4,8-dihydroxy-anthraquinone and 8.8 g of triethyl orthoformate in 100 g of nitrobenzene are heated to 145°–150° C. for about 3 hours, the ethanol formed being distilled off over a bridge and the disappearance of the starting material being followed by thin layer chromatography. 7.8 g of 2,4-dihydroxyquinoline are now added and the mixture is heated to 160°–170° C. until the pigment formation has ended. The pigment, which has crystallised in grey-blue prisms, is then filtererd off at 120° C., washed with hot nitrobenzene and methanol and dried at 100° C. 13.83 g (97.6% of theory) of the bluish-tinged grey pigment of the formula

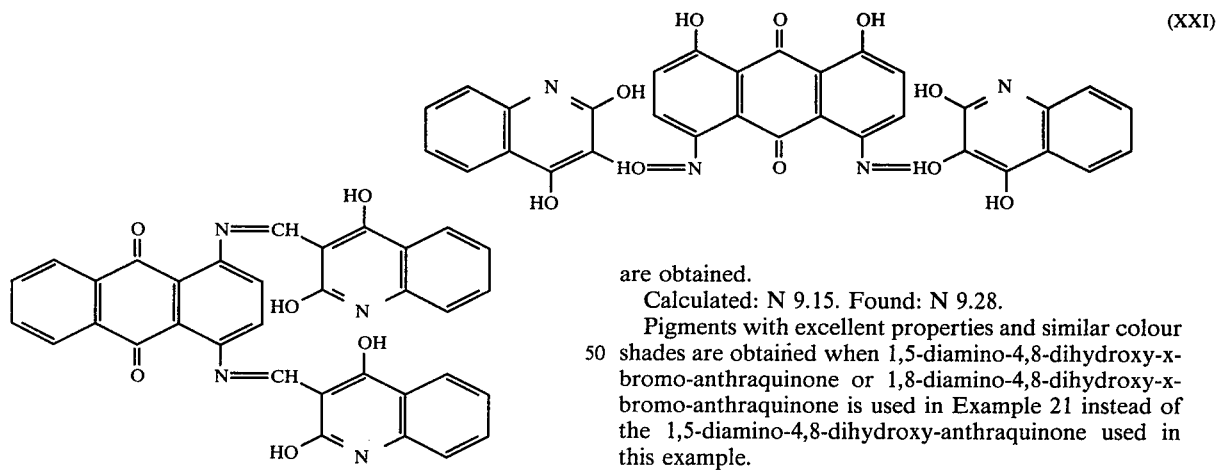

(XX)

are obtained.
Calculated: N 9.15. Found: N 9.3.

If 6.25 g of 1,8-diamino-4,5-dihydroxy-anthraquinone are used in Example 21 instead of the 1,5-diamino-4,8-dihydroxy-anthraquinone, 12.3 g (94% of theory) of the greenish-tinged grey pigment of the formula (XXI)

are obtained.
Calculated: N 9.15. Found: N 9.28.

Pigments with excellent properties and similar colour shades are obtained when 1,5-diamino-4,8-dihydroxy-x-bromo-anthraquinone or 1,8-diamino-4,8-dihydroxy-x-bromo-anthraquinone is used in Example 21 instead of the 1,5-diamino-4,8-dihydroxy-anthraquinone used in this example.

EXAMPLE 22

3.4 of 1,4,5,8-tetraamino-anthraquinone, 9 g of triethyl orthoformate and 125 g of nitrobenzene are heated to 145°–150° C. for 3–4 hours, the ethanol formed being distilled off over a bridge and the disappearance of the starting material being followed by thin layer chromatography. 8.2 g of 2,4-dihydroxy-quinoline are now added and the mixture is heated to 175°–180° C. until the formation of the pigment in blue-black prisms has ended. The pigment is then filtered off at 150° C., washed with hot nitrobenzene and methanol and dried at 100° C. 11.6 g (96% of theory) of the bluish-tinged grey pigment of the formula

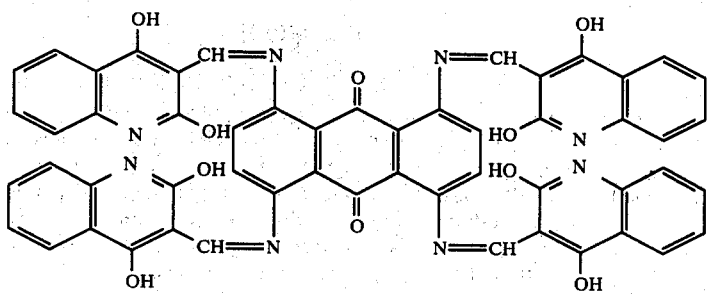

are obtained.
Calculated: 11.76. Found: 12.02.

EXAMPLE 23

13.37 g of 1-amino-4,5,8-trihydroxy-anthraquinone, 8.8 g of triethyl orthoformate and 80 g of nitrobenzene are heated to 145°–150° C. for about 3 hours, the ethanol formed being distilled off over a bridge and the disappearance of the starting material being followed by thin layer chromatography. 8 g of 2,4-dihydroxy-quinoline are now added and the mixture is heated to 155°–160° C. until the formation of the pigment has ended. After cooling to 110° C., the pigment, which has crystallised in brown prisms, is filtered off, washed with hot nitrobenzene and methanol and dried at 100° C. 18 g (87.5% of theory) of the brown pigment of the formula

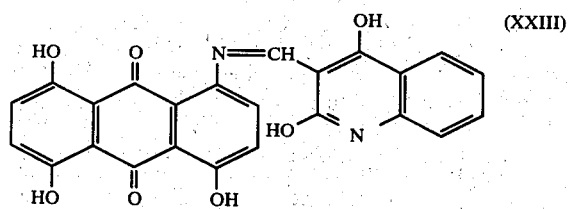

are obtained.
Calculated: N 6.33. Found: N 6.57.

If, instead of 1-amino-4,5,8-trihydroxy-anthraquinone, equivalent amounts of the aminoanthraquinones listed in Table 2 are used in Example 23, corresponding pigments are obtained in the colour shades indicated in the table.

TABLE 2

| Example | Aminoanthraquinone | Color shade of the resulting pigment |
|---|---|---|
| 24 | 1-Amino-5,8-dihydroxy-anthraquinone | bluish-tinged red |
| 25 | 1-Amino-2-bromo-4-hydroxy-anthraquinone | red |
| 26 | 1-Amino-4-anilino-anthraquinone | reddish-tinged grey |

EXAMPLE 27

(a) 8 g of the finely divided pigment obtained according to Example 1a are ground on an automatic Hoover-Muller grinder with a stoving lacquer consisting of 25 g of coconut oil alkyd resin (40% of coconut oil), 10 g of melamine resin, 50 g of toluene and 7 g of glycol monomethyl ether. The mixture is applied to the substrate to be lacquered and the lacquer is hardened by stoving at 130° C. to give reddish-tinged yellow lacquerings with very good fastness to over-lacquering and outstanding fastness to light and weathering.

Pigmented stoving lacquers with the same fastness properties are obtained if 15–25 g of the alkyd resin indicated or of an alkyd resin based on cottonseed oil, dehydrated castor oil, castor oil or synthetic fatty acids are used, and 10–15 g of the melamine resin mentioned or of a condensation product of formaldehyde with urea or with benzoguanamine are used instead of the amount of melamine resin indicated.

(b) If 1 to 10 g of a mixture of titanium dioxide (rutile type) with the pigment indicated in Example 1a in the ratio 0.5–50:1 are ground into the lacquer described in Example 27a instead of the amount of pigment indicated, the same further processing gives lacquerings with the same fastness properties and with a reddish-tinged yellow colour shade which shifts towards white with an increasing content of titanium dioxide.

EXAMPLE 28

6 g of finely divided pigment according to Example 1a are ground into 100 g of a nitrocellulose lacquer consisting of 44 g of collodion cotton (low-viscosity, 35% strength, butanol-moist), 5 g of dibutyl phthalate, 40 g of ethyl acetate, 20 g of toluene, 4 g of n-butanol and 10 g of glycol monomethyl ether. After brushing the lacquer onto a substrate and drying, reddish-tinged yellow lacquerings of outstanding fastness to light and over-lacquering are obtained. The same results are obtained using nitrocellulose lacquers which have a nitrocellulose content of 10–15 g and a plasticiser content of 5–10 g and contain 70–85 g of a solvent mixture, aliphatic esters, such as ethyl acetate and butyl acetate, and aromatics, such as toluene and xylene, and relatively small proportions of aliphatic ethers, such as glycol ether, and alcohols, such as butanol, preferably being used. By plasticisers there may be understood, for example: phthalates, such as dioctyl phthalate and dibutyl phthalate, esters of phosphoric acid, and castor oil, by itself or in combination with oil-modified alkyd resins.

Lacquerings with similar fastness properties are obtained using other spirit lacquers, Zapon lacquers and nitrocellulose lacquers which dry physically, air-drying oil varnishes, synthetic resin lacquers and nitrocellulose combination lacquers, and oven-drying and air-drying epoxide resin lacquers, if appropriate in combination with urea resins, melamine resins, alkyd resins or phenolic resins.

EXAMPLE 29

5 g of finely divided pigment according to Example 1a are ground in a porcelain ball mill with 100 g of an unsaturated polyester resin which dries without paraffin. 10 g of styrene, 59 g of melamine/formaldehyde resin and 1 g of a paste consisting of 40% of cyclohexanone peroxide and 60% of dibutyl phthalate are stirred thoroughly with the ground material, and finally 4 g of dryer solution (10% strength cobalt naphthenate in white spirit) and 1 g of silicone oil solution (1% strength in xylene) are admixed. The mixture is applied to primed wood and a high-gloss, water-resistant reddish-tinged yellow lacquering which is fast to weathering and has outstanding fastness to light is obtained.

If amine-hardening epoxide resin lacquers with dipropylenediamine as the amine component are used instead of the reactive lacquer based on unsaturated polyester resins, reddish-tinged yellow lacquerings of outstanding fastness to weathering and effluorescence are obtained.

EXAMPLE 30

100 g of a 65% strength solution of an aliphatic polyester, with about 8% of free hydroxyl groups, in glycol monomethyl ether-acetate are ground with 5 g of the pigment obtained according to Example 1a and the ground material is then mixed thoroughly with 44 g of a 67% strength solution of the reaction product of 1 mol of trimethylolpropane and 3 mols of toluylene diisocyanate. Without impairment of the pot life, after application of the mixture and reaction of the components, high-gloss reddish-tinged yellow polyurethane lacquerings of outstanding fastness to effluorescence, light and weathering result.

Pigmentations of similar fastness are obtained using other two-component lacquers based on aromatic or aliphatic isocyanates and polyethers or polyesters containing hydroxyl groups, and with polyisocyanate lacquers which dry in the presence of moisture and give polyurea lacquerings.

EXAMPLE 31

5 g of a fine paste obtained by kneading 50 g of the pigment obtained according to Example 1a with 15 g of an aryl polyglycol ether emulsifier and 35 g of water are mixed with 10 g of baryte, as the filler, 10 g of titanium dioxide (rutile type) as a white pigment, and 40 g of an aqueous emulsion paint containing about 50% of polyvinyl acetate. The paint is brushed onto the substrate and, after drying, reddish-tinged yellow paint films of very good fastness to lime and cement and outstanding fastness to weathering and light are obtained.

The fine paste obtained by kneading is likewise suitable for pigmenting clear polyvinyl acetate emulsion paints, and for emulsion paints which contain copolymers of styrene and maleic acids as binders and emulsion paints based on polyvinyl propionate, polymethacrylate or butadiene/styrene.

EXAMPLE 32

10 g of the pigment paste mentioned in Example 31 are mixed with a mixture of 5 g of chalk and 5 g of 20% strength size solution. A reddish-tinged yellow wallpaper paint with which coatings of outstanding fastness to light are achieved is obtained. To prepare the pigment paste, it is also possible to use other non-ionic emulsifiers, such as the reaction products of nonylphenol and ethylene oxide, or ionic wetting agents, such as the sodium salts of alkylarylsulphonic acids, for example of dinaphthylmethanedisulphonic acid, sodium salts of substituted sulphonic acid esters and sodium salts of paraffinsulphonic acids, in combination with alkyl polyglycol ethers.

EXAMPLE 33

A mixture of 65 g of polyvinyl chloride, 35 g of diisooctyl phthalate, 2 g of dibutyl-tin mercaptide, 0.5 g of titanium dioxide and 0.5 g of the pigment of Example 1a is compounded on a mixing mill at 165° C. An intensely reddish-tinged yellow-coloured mass which can be used for producing films or shaped articles is obtained. The coloration is distinguished by outstanding fastness to light and very good fastness to plasticisers.

EXAMPLE 34

0.2 g of the pigment according to Example 1a is mixed with 100 g of polyethylene granules, polypropylene granules or polystyrene granules. The mixture can be either injection-moulded directly in an injection-moulding machine at 220° to 280° C., or processed to coloured rods in an extruder or to coloured hides on a mixing mill. If appropriate, the rods and hides are granulated and the granules injection-moulded in an injection-moulding machine.

The reddish-tinged yellow moulded articles have very good fastness to light and migration. Synthetic polyamides of caprolactam or adipic acid and hexamethylenediamine, or the condensation products of terephthalic acid and ethylene glycol can be coloured in a similar manner at 280°–300° C., if appropriate under a nitrogen atmosphere.

EXAMPLE 35

1 g of the pigment according to Example 1a, 10 g of titanium dioxide (rutile type) and 100 g of a pulverulent copolymer based on acrylonitrile/butadiene/styrene are mixed and the mixture is compounded on a roll mill at 140°–180° C. A reddish-tinged yellow-coloured hide is obtained and is granulated and the granules are injection-moulded in an injection-moulding machine at 200°–250° C. Reddish-tinged yellow moulded articles of very good fastness to light and migration and excellent stability to heat are obtained.

Plastics based on cellulose acetate, cellulose butyrate and mixtures thereof can be coloured in shades with similar fastness properties in a similar manner, but at temperatures of 180°–220° C. and without the addition of titanium dioxide.

EXAMPLE 36

0.2 g of finely divided pigment according to Example 1a is mixed with 100 g of a plastic based on polycarbonate in an extruder or in a kneading screw at 250°–280° C. and the mixture is processed to granules. Reddish-tinged yellow, transparent granules of outstanding fastness to light and stability to heat are obtained.

EXAMPLE 37

90 g of a slightly branched polypropylene glycol with a molecular weight of 2,500 and a hydroxyl number of 56, 0.25 g of endoethylenepiperazine, 0.3 g of tin-II octoate, 1.0 g of a polyether siloxane, 3.5 g of water and 12.0 g of a paste of 10 g of the pigment according to Example 1a in 50 g of the polypropylene glycol indicated are mixed thoroughly with one another, the mixture is then mixed intimately with 45 g of toluylene diisocyanate (80% of the 2,4-isomer and 20% of the 2,6-isomer), and the final mixture is poured into a mould. After 6 seconds, the mixture becomes cloudy and foams. After 70 seconds, an intensively reddish-tinged yellow-coloured, soft polyurethane foam has formed, the pigmentation of which has outstanding fastness to light.

EXAMPLE 38

90 g of a slightly branched polyester of adipic acid, diethylene glycol and trimethylolpropane which has a molecular weight of 2,000 and a hydroxyl number of 60 are mixed with the following components: 1.2 g of dimethylbenzylamine, 2.5 g of sodium castor oil-sulphate, 2.0 g of an oxyethylated, benzylated hydroxydiphenyl, 1.75 g of water and 12 g of a paste prepared by grinding 10 g of the pigment according to Example 1a in 50 g of the abovementioned polyester. After the mixing, 40 g of toluylene diisocyanate (65% of the 2,4-isomer and 35% of the 2,6-isomer) are stirred in and the mixture is poured into a mould and foamed. After 60 seconds, a reddish-tinged yellow-coloured, soft polyurethane foam has formed, the coloration of which is distinguished by very good fastness to light.

EXAMPLE 39

Deep reddish-tinged yellow offset prints of high brilliancy and very good fastness to light and lacquering are obtained with a printing paste prepared by grinding 35 g of the pigment according to Example 1a with 65 g of linseed oil and adding 1 g of siccative (Co naphthenate, 50% strength in white spirit). Using this printing paste in letterpress printing, collotype printing, lithographic printing or die stamping leads to reddish-tinged yellow prints with similar fastness properties. If the pigment is used for colouring tinplate printing pastes or low-viscosity gravure printing pastes or printing inks, reddish-tinged yellow prints with similar fastness properties are obtained.

EXAMPLE 40

A printing paste is prepared from 10 g of the fine pigment paste indicated in Example 31, 100 g of 3% strength tragacanth gum, 100 g of an aqueous 50% strength egg albumin solution and 25 g of a non-ionic wetting agent. A textile fibre fabric is printed with this paste and steamed at 100° C. and a reddish-tinged yellow print which is distinguished by excellent fastness properties, in particular fastness to light, is obtained. Other binders which can be used for fixing the pigment onto the fibre, for example binders based on synthetic resin, or British gum or cellulose glycolate, can be used in the printing formulation instead of the tragacanth gum and egg albumin.

EXAMPLE 41

A mixture of 100 g of light crepe, 2.6 g of sulphur, 1 g of stearic acid, 1 g of mercaptobenzthiazole, 0.2 g of hexamethylenetetramine, 5 g of zinc oxide, 60 g of chalk and 2 g of titanium dioxide (anatase type) is compounded on a mixing mill at 50° C. and coloured with 2 g of the pigment obtained according to Example 1a, and the final mixture is then vulcanised at 140° C. for 12 minutes. A reddish-tinged yellow-coloured vulcanisation product of very good fastness to light is obtained.

EXAMPLE 42

22.5 l of an aqueous, approximately 9% strength viscose solution are added to 100 g of a 20% strength aqueous paste of the pigment according to Example 1a, in a stirred apparatus, which has been prepared, for example, by dissolving the pigment in 96% strength sulphuric acid, discharging the solution onto ice, filtering the mixture and washing the material on the filter with water until neutral. The coloured composition is stirred for 15 minutes and then deaerated and subjected to a spinning and desulphurising process. Yellowish-tinged red filaments or films with very good fastness to light are obtained.

EXAMPLE 43

10 kg of paper pulp containing 4 g of cellulose per 100 g are treated in a hollander for about 2 hours. During this period, 4 g of rosin size, then 30 g of an approximately 15% strength pigment dispersion obtained by grinding 4.8 g of the pigment obtained according to Example 1a with 4.8 g of dinaphthylmethanedisulphonic acid and 22 g of water in a ball mill, and then 5 g of aluminium sulphate are added, in each case at intervals of a quarter of an hour.

After finishing on a paper-making machine, reddish-tinged yellow-coloured paper of outstanding fastness to light is obtained.

EXAMPLE 44

The yellow-pigmented paper produced according to Example 43 is impregnated with a 55% strength solution of a urea/formaldehyde resin in n-butanol and baked at 140° C. Reddish-tinged yellow laminated paper of very good fastness to migration and outstanding fastness to light is obtained.

Laminated paper with the same fastness properties is obtained by laminating paper which has been printed, by the gravure printing process, with a printing paste containing the fine yellow pigment paste described in Example 31 and water-soluble or saponifiable binders.

EXAMPLE 45

20 g of the pigment obtained according to Example 1a are finely dispersed in 50 g of dimethylformamide in a bead mill, using a dispersing agent consisting of 50 g of a 10% strength solution of polyacrylonitrile in dimethylformamide. The pigment concentrate thus obtained is added to a spinning solution of polyacrylonitrile in a known manner and the spinning solution is homogenised and then spun to filaments by known dry spinning processes or wet spinning processes.

Reddish-tinged yellow-coloured filaments, the colorations of which are distinguished by very good fastness to rubbing, washing, migration, heat, light and weathering, are obtained.

What is claimed is:

1. Anthraquinone derivatives of the formula

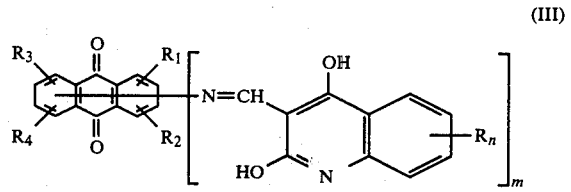

(III)

or of the corresponding tautomeric formula, wherein
m denotes a number from 1 to 4,
R denotes a substituent and
n denotes 0, 1, 2, 3 or 4,
$R_1$ denotes hydrogen, halogen, such as fluorine, chlorine and bromine, nitro, $C_1$–$C_4$-alkyl, $C_1$–$C_4$- alkoxy, $C_1$-$C_4$-alkylamino, benzylamino, cyclohexylamino, $C_1$-$C_4$-alkylmercapto, phenylmercapto which is optionally substituted by $C_1$-$C_4$-alkyl, $C_1$-$C_4$-alkoxy, fluorine, chlorine, bromine or nitro, $C_1$-$C_4$-alkylcarbonyl, $C_1$-$C_4$-alkoxycarbonyl, phenylamino which is optionally substituted by $C_1$-$C_4$-alkyl, $C_1$-$C_4$-alkoxy, chlorine or nitro, carbamoyl which is optionally monosubstituted or disubstituted by $C_1$-$C_4$-alkyl, benzyl or phenyl, it being possible for phenyl to be substituted by $C_1$-$C_4$-alkyl, $C_1$-$C_4$-alkoxy, fluorine, chlorine, bromine or nitro, carboxyl, hydroxyl, $C_1$-$C_4$-alkylcarbonylamino, benzoylamino which is optionally substituted by $C_1$-$C_4$-alkyl, $C_1$-$C_4$-alkoxy, chlorine, bromine or nitro, or phenylsulphonylamino which is optionally substituted by $C_1$-$C_4$-alkyl, $C_1$-$C_4$-alkoxy, fluorine, chlorine, bromine or nitro, $R_2$ denotes hydrogen, chlorine or hydroxyl, $R_3$ denotes hydrogen, halogen, such as fluorine, chlorine or bromine, nitro, $C_1$-$C_4$-alkyl, $C_1$-$C_4$-alkoxy, $C_1$-$C_4$-alkylamino, $C_1$-$C_4$-alkylmercapto, phenylmercapto which is optionally substituted by $C_1$-$C_4$-alkyl, $C_1$-$C_4$-alkoxy, fluroine, chlorine, bromine or nitro, $C_1$-$C_4$-alkoxycarbonyl, $C_1$-$C_4$-alkylcarbonyl, benzylamino, cyclohexylamino, phenylamino which is optionally substituted by $C_1$-$C_4$-alkyl, $C_1$-$C_4$-alkoxy, chlorine, bromine or nitro, carboxyl, hydroxyl, carbamoyl which is optionally monosubstituted or disubstituted by $C_1$-$C_4$-alkyl, benzyl or phenyl, it being possible for phenyl to be substituted by $C_1$-$C_4$-alkyl, $C_1$-$C_4$-alkoxy, fluorine, chlorine, bromine or nitro, $C_1$-$C_4$-alkylcarbonylamino, benzoylamino which is optionally substituted by $C_1$-$C_4$-alkyl, $C_1$-$C_4$-alkoxy, chlorine, bromine or nitro, $C_1$-$C_4$-alkylsulphonylamino, or phenylsulphonylamino which is optionally substituted by $C_1$-$C_4$-alkyl, $C_1$-$C_4$-alkoxy, fluorine, chlorine, bromine or nitro and $R_4$ denotes hydrogen, halogen, such as fluorine, chlorine and bromine, or hydroxyl.

2. Anthraquinone derivatives of the formula

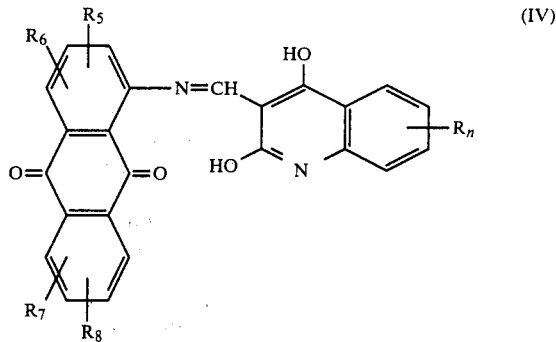

(IV)

or of the corresponding tautomeric formula, wherein
R and n have the meaning indicated in claim 1 and
$R_5$, $R_6$, $R_7$ and $R_8$ denote hydrogen, chlorine, bromine, carboxyl, $C_1$-$C_4$-alkoxycarbonyl, carbamoyl, $C_1$-$C_4$-alkylcarbonylamino, benzoylamino which is optionally substituted by 1 or 2 nitro groups or 1 to 5 chlorine or bromine atoms, $C_1$-$C_4$-alkylsulphonylamino, phenylsulphonylamino which is optionally substituted by methyl, methoxy or chlorine, or a radical of the formula

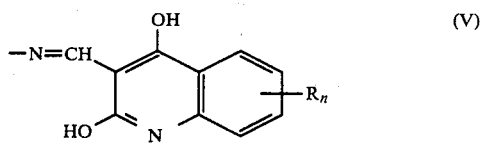

(V)

* * * * *